United States Patent
Miyazaki

(10) Patent No.: US 10,438,067 B2
(45) Date of Patent: Oct. 8, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yasuyoshi Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 15/483,403

(22) Filed: Apr. 10, 2017

(65) Prior Publication Data

US 2017/0300756 A1    Oct. 19, 2017

(30) Foreign Application Priority Data

Apr. 15, 2016  (JP) ................. 2016-082348

(51) Int. Cl.
*G06K 9/00* (2006.01)
*H04N 1/32* (2006.01)

(52) U.S. Cl.
CPC ..... *G06K 9/00751* (2013.01); *G06K 9/00302* (2013.01); *H04N 1/32101* (2013.01); *G06K 2009/00738* (2013.01); *H04N 2201/0084* (2013.01); *H04N 2201/3252* (2013.01)

(58) Field of Classification Search
CPC ........... G06K 9/00751; G06K 9/00302; H04N 1/32101
See application file for complete search history.

(56) References Cited

U.S. PATENT DOCUMENTS

| | | | |
|---|---|---|---|
| 8,958,650 B1 * | 2/2015 | Svendsen | G06K 9/00677 382/218 |
| 2002/0122212 A1 * | 9/2002 | Tojo | G11B 27/034 358/453 |
| 2007/0071406 A1 | 3/2007 | Koga et al. | |
| 2008/0166051 A1 * | 7/2008 | Miyamoto | G06F 17/30253 382/190 |
| 2008/0240503 A1 * | 10/2008 | Okada | G06K 9/00228 382/103 |
| 2008/0304706 A1 * | 12/2008 | Akisada | G06K 9/00771 382/103 |
| 2010/0054705 A1 * | 3/2010 | Okamoto | G10L 25/48 386/241 |

FOREIGN PATENT DOCUMENTS

JP    2007-267351 A    10/2007

* cited by examiner

*Primary Examiner* — Mia M Thomas
(74) *Attorney, Agent, or Firm* — Venable LLP

(57) ABSTRACT

An image processing apparatus that selects images for digest reproduction from a plurality of images. The apparatus includes at least one processor or circuit configured to perform the operations of an information acquisition unit configured to acquire, for every image, shooting information including information on a lens used in shooting the images, an image evaluation unit configured to derive evaluation values for images based on the shooting information and an evaluation criterion, and an image selection unit configured to select images for digest reproduction by ranking images based on the evaluation values. The image evaluation unit derives the evaluation values of the images using different evaluation criteria based on characteristics of the lens used in shooting the images.

19 Claims, 10 Drawing Sheets

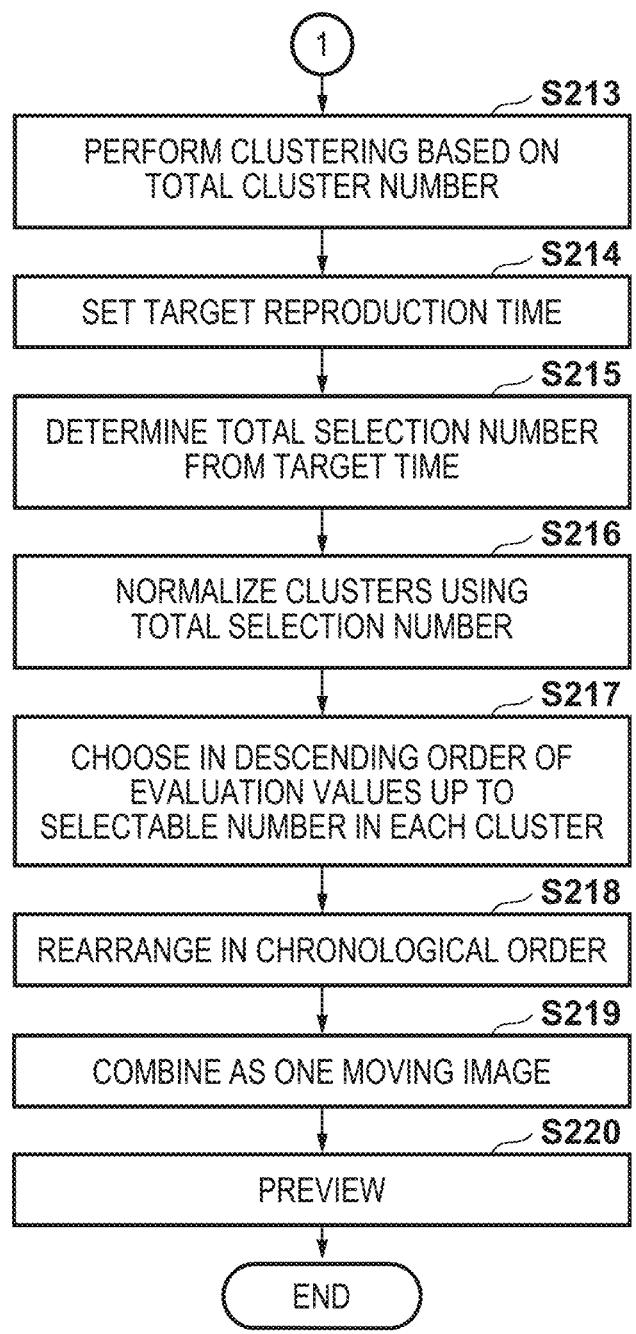

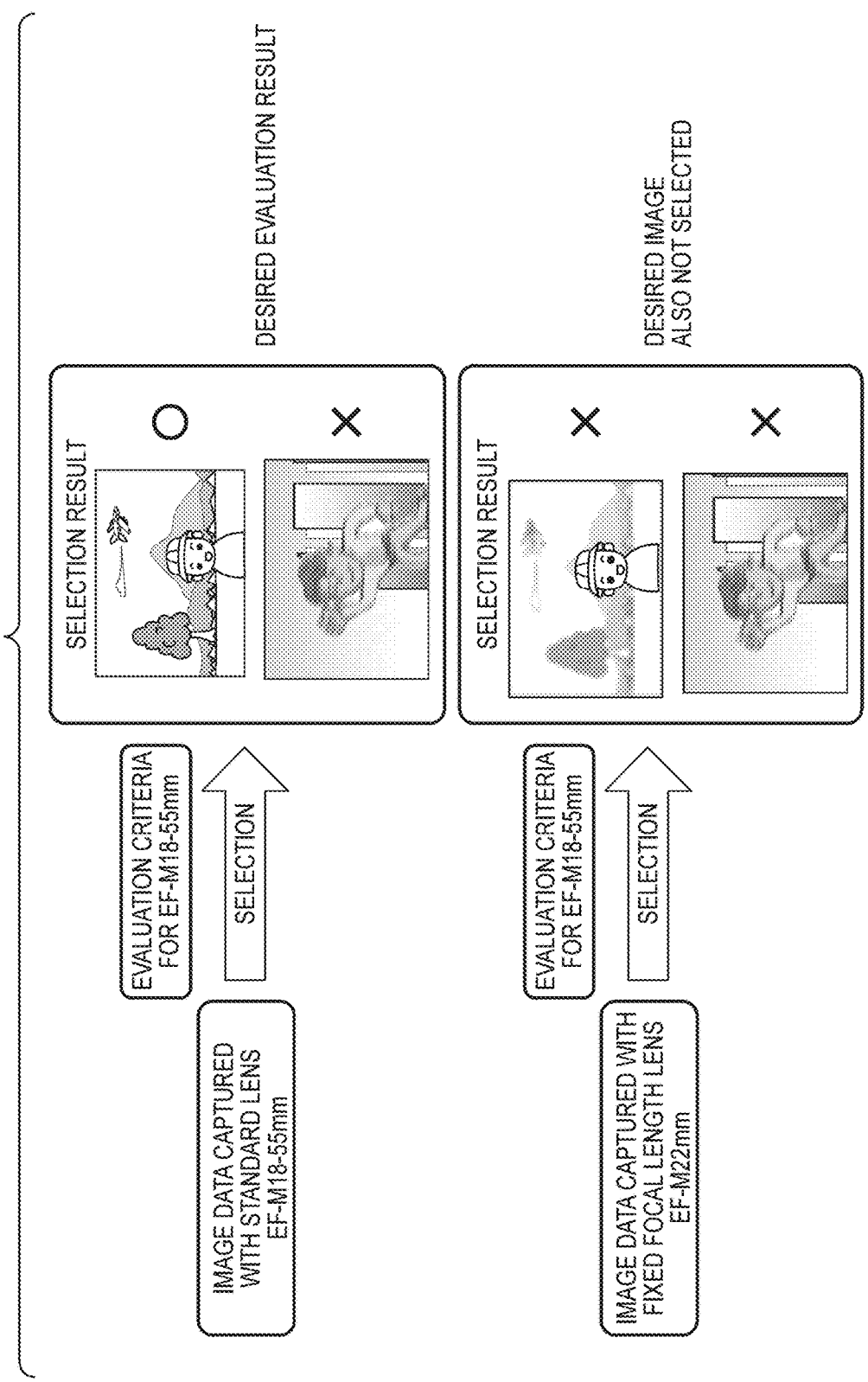

FIG. 7

| FOCAL LENGTH (35mm) | LENS TYPE | CHARACTERISTICS |
|---|---|---|
| < 24mm | SUPER WIDE-ANGLE LENS | FISH-EYE LENS, ETC.; STRONG BARREL DISTORTION EFFECT |
| 24~35mm | WIDE-ANGLE LENS | WIDE ANGLE OF VIEW<br>DEEP DEPTH OF FIELD<br>SHORT FOCAL DISTANCE<br>DISTANT OBJECTS FEEL MORE DISTANT, SENSE OF DEPTH<br>CLOSE OBJECTS APPEAR LARGE, DISTANT BACKGROUND APPEARS SMALL<br>BARREL DISTORTION |
| 35~40mm | SEMI WIDE-ANGLE LENS | MODERATELY WIDE ANGLE OF VIEW |
| 40~60mm | STANDARD LENS | WEAK WIDE-ANGLE/TELEPHOTO EFFECT<br>STANDARD DEPICTION POSSIBLE |
| 60~135mm | MID TELEPHOTO | LITTLE DEPTH PERCEPTION WITH BACKGROUND<br>BALANCED SENSE OF DISTANCE BETWEEN BACKGROUND AND OBJECT<br>SHALLOW DEPTH OF FIELD, SENSE OF BOKEH<br>IMPRESSION OF SUBJECT STANDING OUT AGAINST BACKGROUND/FOREGROUND |
| 135~300mm | TELEPHOTO LENS | LITTLE DEPTH PERCEPTION<br>COMPRESSION EFFECT, DISTANT OBJECTS BROUGHT CLOSER<br>VERY SHALLOW DEPTH OF FIELD, STRONG SENSE OF BOKEH |
| > 300mm | SUPER TELEPHOTO | STRONG SENSE OF BOKEH<br>STRONG COMPRESSION EFFECT |

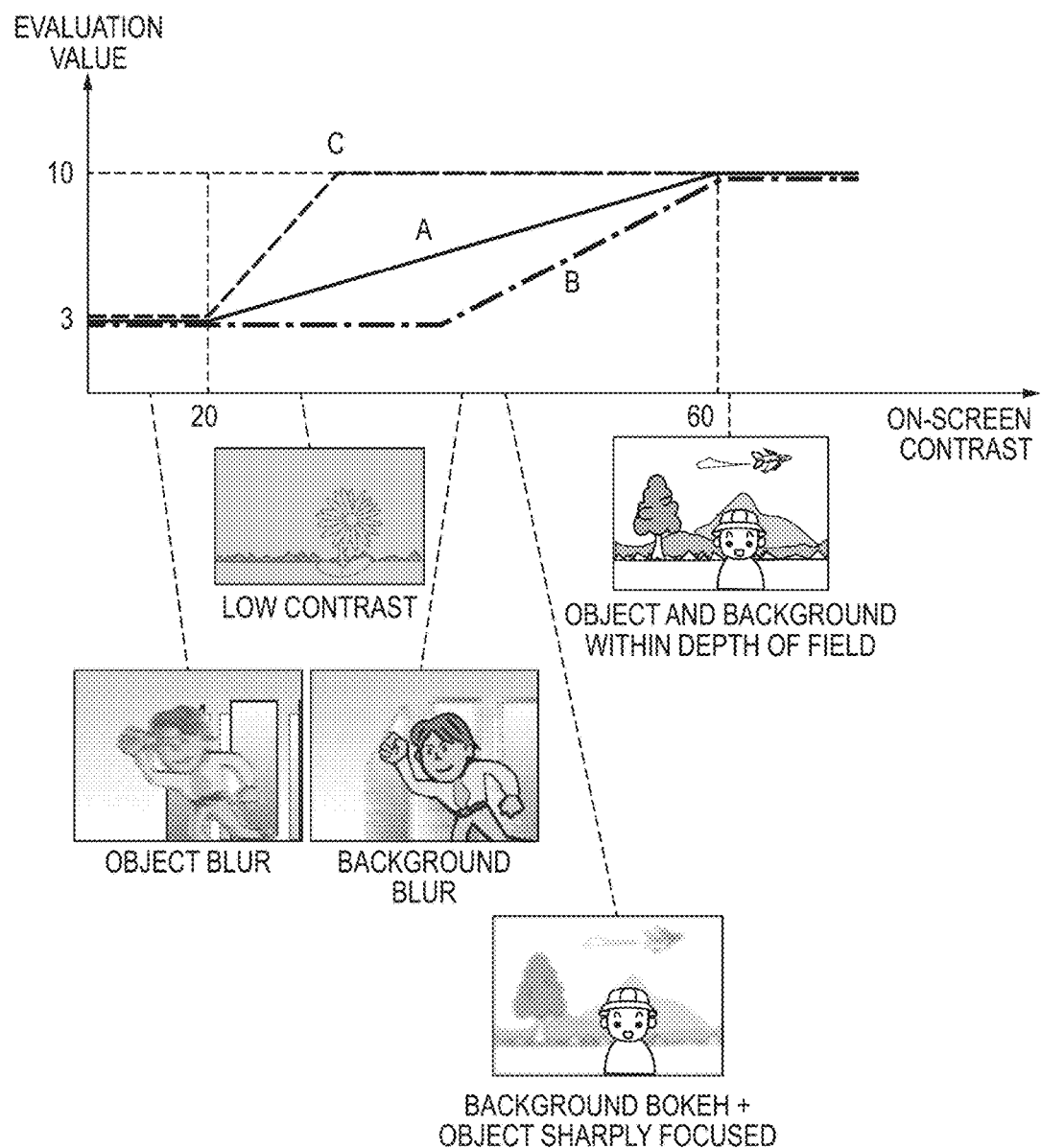

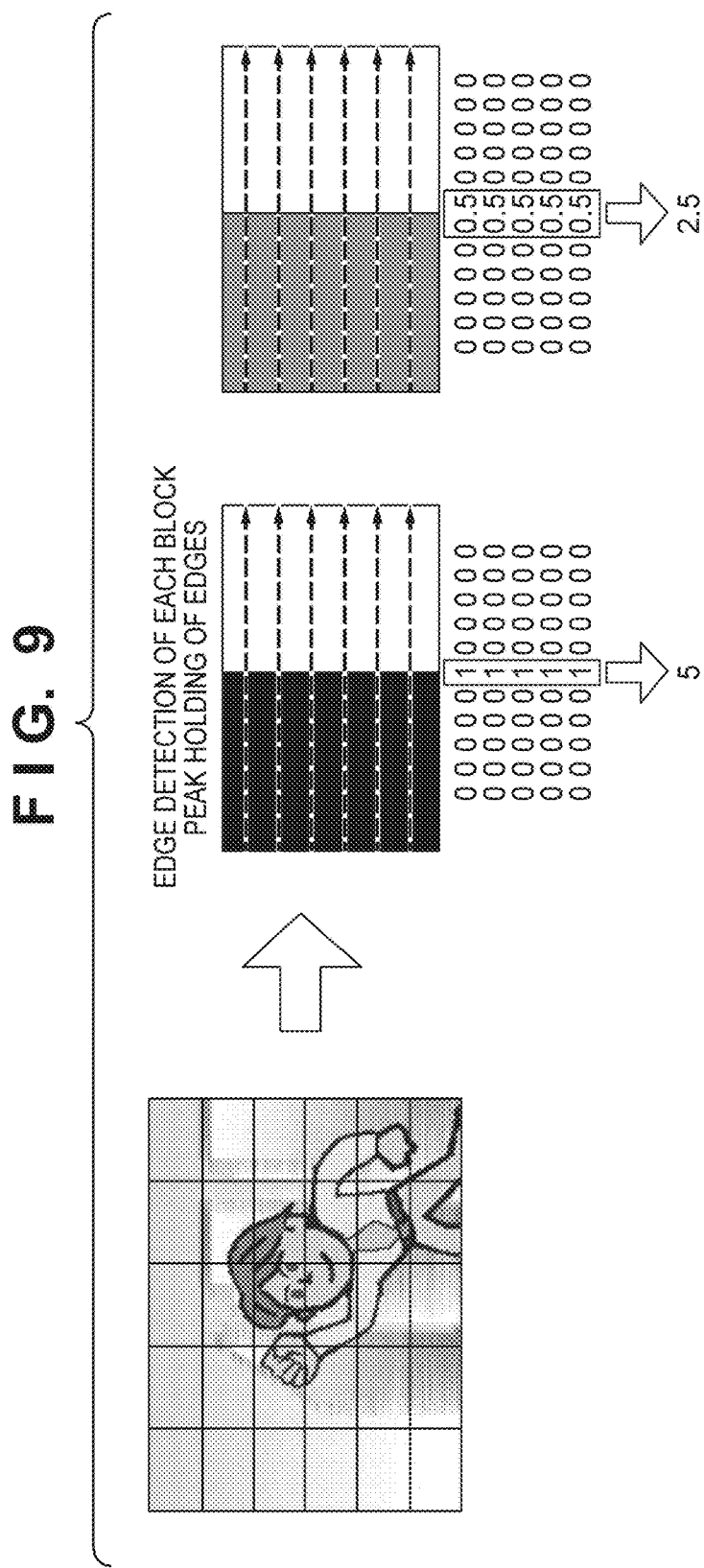

IMAGE PROCESSING APPARATUS, IMAGE PROCESSING METHOD, AND STORAGE MEDIUM

CLAIM TO PRIORITY

This application claims the benefit of Japanese Patent Application No. 2016-082348, filed Apr. 15, 2016, which is hereby incorporated by reference herein in its entirety.

BACKGROUND OF THE INVENTION

Field of the Invention

The present invention relates to image processing technology for selecting a plurality of images for image digest reproduction.

Description of the Related Art

Heretofore, digital cameras capable of performing preview reproduction of a still image or a moving image recorded on a recording medium when recording the still image or moving image to the recording medium, were known. With a digital camera having such a preview function, it takes a long time to view all of the images when a large number of still images or moving images are recorded on the recording medium. Japanese Patent Laid-Open No. 2007-267351 thus discloses a technology for extracting only important scenes from a moving image and performing digest reproduction on the extracted scenes. In particular, in Japanese Patent Laid-Open No. 2007-267351, important scenes are distinguished by the volume of audio in a moving image recorded of a game of soccer, or the like, and scenes exceeding a predetermined audio level are chosen and subjected to digest reproduction.

However, when scenes are chosen by audio level alone, as in Japanese Patent Laid-Open No. 2007-267351, only scenes of certain parts may be extracted. For example, Japanese Patent Laid-Open No. 2007-267351 is suitable for extracting scenes in which the crowd reacts, such as a goal scene, but the lead up to the goal scene will not be extracted, and digest reproduction of only goal scenes will be continuously performed.

Images for high quality digest reproduction without scene bias, or the like, can be generated by using object information within images as evaluation values in image selection. However, in the case of performing image selection for digest reproduction on images captured with an interchangeable lens camera, or the like, there are lenses whose lens characteristics differ greatly, thus, possibly giving rise to problems when similar evaluation criteria to compact digital cameras, for example, are applied. For example, when images obtained with an EF-M22m fixed focal length lens capable of shooting with a very shallow depth of field and images obtained with an EF-M18-55 mm zoom lens are evaluated with equivalent criteria, images that are not defective in terms of peripheral bokeh (the way the lens renders out-of-focus points of light) could possibly be judged to be defective images (see FIG. 6).

SUMMARY OF THE INVENTION

The present invention has been made in consideration of the aforementioned problems, and realizes a technology for performing image selection for digest reproduction with consideration for the lens used in shooting the images.

In order to solve the aforementioned problems, one aspect of the present invention provides an image processing apparatus that selects images for digest reproduction from a plurality of images, comprising an information acquisition unit configured to acquire, for every image, shooting information generated at a time of shooting, an image evaluation unit configured to derive evaluation values for images based on the shooting information and an evaluation criterion, and an image selection unit configured to select images for digest reproduction by ranking images based on the evaluation values, wherein the image evaluation unit changes the evaluation criterion based on information on a lens used in shooting the images.

Another aspect of the present invention provides an image processing method that selects images for digest reproduction from a plurality of images, the method comprising acquiring, for every image, shooting information generated at a time of shooting, deriving evaluation values for images based on the shooting information and an evaluation criterion, and selecting images for digest reproduction by ranking images based on the evaluation values, wherein, in deriving the evaluation values of the images, the evaluation criterion is changed based on information on a lens used in shooting the images.

Still another aspect of the present invention provides a non-transitory computer-readable storage medium storing a program for causing a computer to execute an image processing method that selects images for digest reproduction from a plurality of images, the method comprising acquiring, for every image, shooting information generated at a time of shooting, deriving evaluation values for images based on the shooting information and an evaluation criterion, and selecting images for digest reproduction by ranking images based on the evaluation values, wherein, in deriving the evaluation values of the images, the evaluation criterion is changed based on information on a lens used in shooting the images.

According to the present invention, erroneous judgment in image selection can be avoided and high quality digest reproduction images can be generated, by performing image selection for digest reproduction with consideration for the lens used in shooting the images.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are flowcharts showing processing for selecting images for digest reproduction according to one embodiment.

FIG. 6 is a diagram illustrating a result of image selection according to differences in lens type.

FIG. 7 is a diagram illustrating lens types.

FIG. 8 is a diagram illustrating differences in evaluation criteria according to lens type.

FIG. 9 is a diagram for describing a method of calculating contrast evaluation values.

DESCRIPTION OF THE PREFERRED EMBODIMENTS

Hereafter, embodiments for carrying out the present invention will be described in detail. It is to be understood that the embodiments that will be described below are examples for realizing the present invention, and can be corrected or modified as appropriate depending on the configuration of the apparatus to which the invention is applied and various conditions, and that the invention is not intended to be limited to the following embodiments. Also, aspects of the embodiments that will be discussed later may be combined as appropriate.

First Embodiment

An image capturing apparatuses such as a digital camera will be described below as an image processing apparatus of the present embodiment.

Apparatus Configuration

Figure 1:
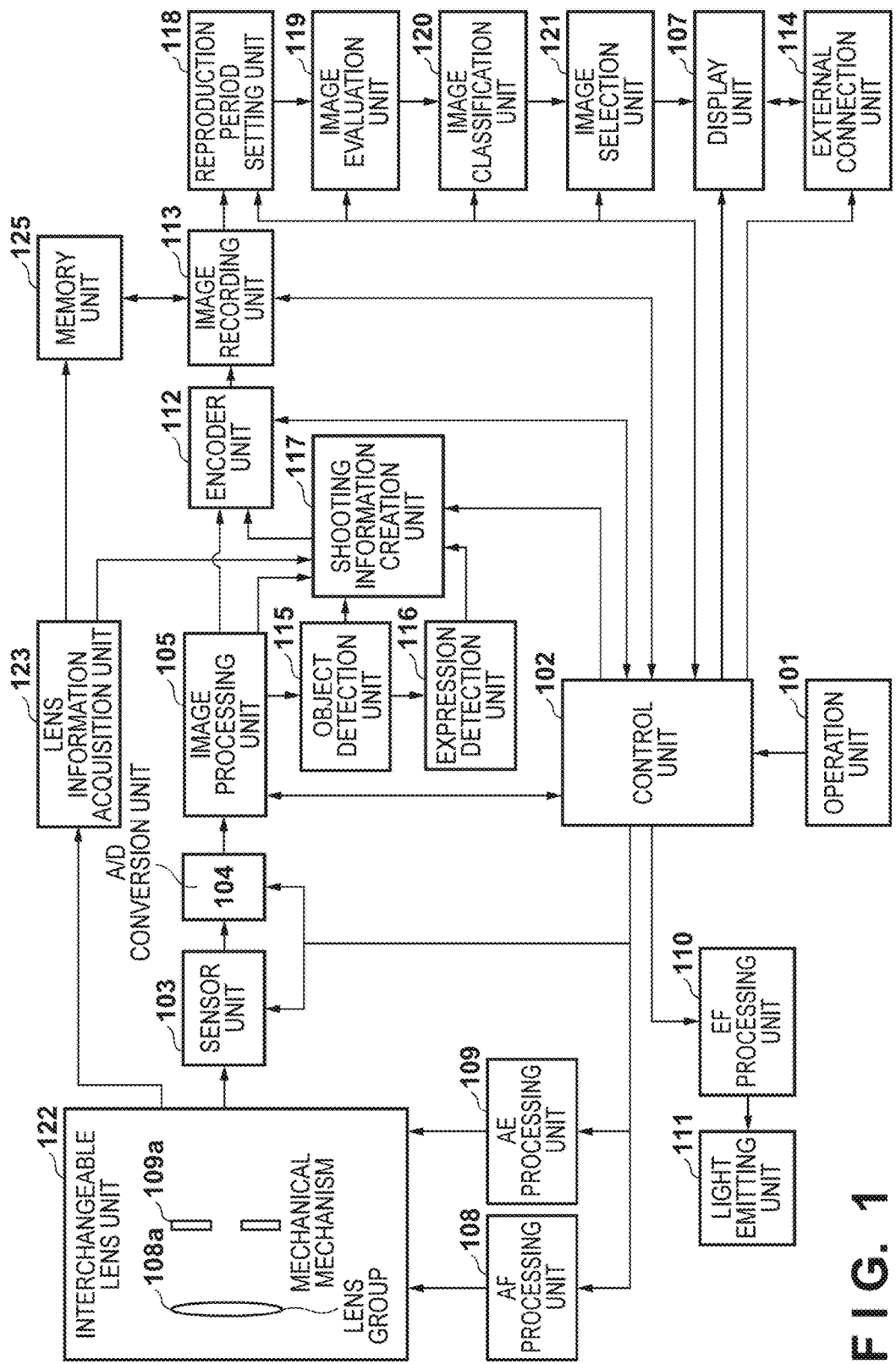
FIG. 1 is a block diagram showing an apparatus configuration according to one embodiment.

The configuration and functions of the image capturing apparatus of the present embodiment will be described below, with reference to FIG. 1.

An operation unit 101 is constituted by switches, buttons, or the like, that an operator of the digital camera (hereafter, camera) of the present embodiment operates in order to input various instructions to the camera. The operation unit 101 also includes a power switch, a shutter switch, and a touch sensor (operation member that enables touch operations on a display panel). A control unit 102 includes a CPU, a RAM, a ROM, a dedicated circuit, and the like, for performing overall control of the various functions of the camera shown in FIG. 1. The CPU realizes processing from shooting to preview, as will be discussed later, by unpacking programs stored in the ROM, which is a nonvolatile memory, in the RAM, which serves as a work memory, and executing these programs.

A sensor unit 103 includes an image sensor such as a CCD or a CMOS sensor, and is configured to receive light that is incident via a lens group 108a and a mechanical mechanism 109a, to accumulate electrical charge that depends on the amount of light, and to output image signals. In the present embodiment, the camera is an interchangeable lens camera to which an interchangeable lens unit 122 is attachable and detachable with respect to a front surface of a camera main body, with the interchangeable lens unit 122 also being mountable in other cameras, besides the digital camera of the present embodiment. The interchangeable lens unit 122 includes the lens group 108a including a focus lens and a zoom lens, and a mechanical mechanism 109a including a diaphragm and a shutter. A lens information acquisition unit 123 acquires lens information from the interchangeable lens unit 122, and attaches the acquired lens information to the captured image data.

An A/D conversion unit 104 performs processing, such as sampling, gain adjustment, and A/D conversion on analog image signals output from the sensor unit 103, and outputs the result as digital image signals. An image processing unit 105 performs various types of image processing on the digital image signals output from the A/D conversion unit 104, and outputs processed digital image signals. For example, the digital image signals received from the A/D conversion unit 104 are output after being converted into YUV color coding image signals.

Figure 4A:
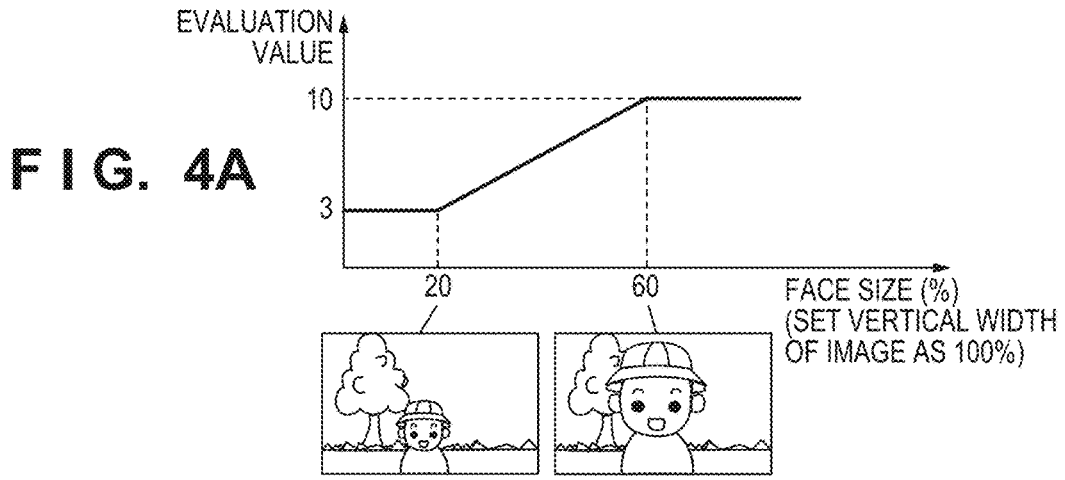
FIGS. 4A to 4C are diagrams for describing a method of calculating evaluation values in image selection.
Figure 4B:
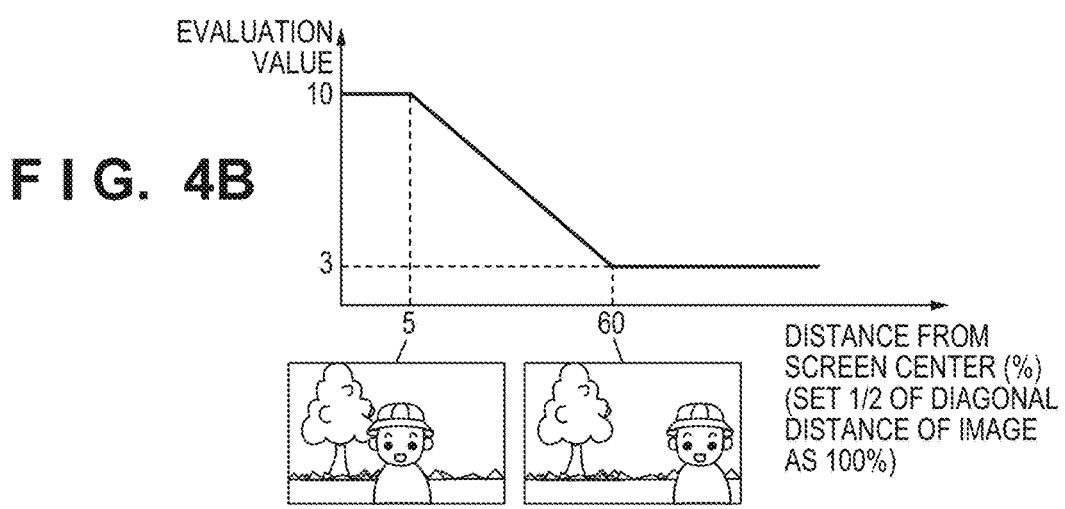
Figure 4C:
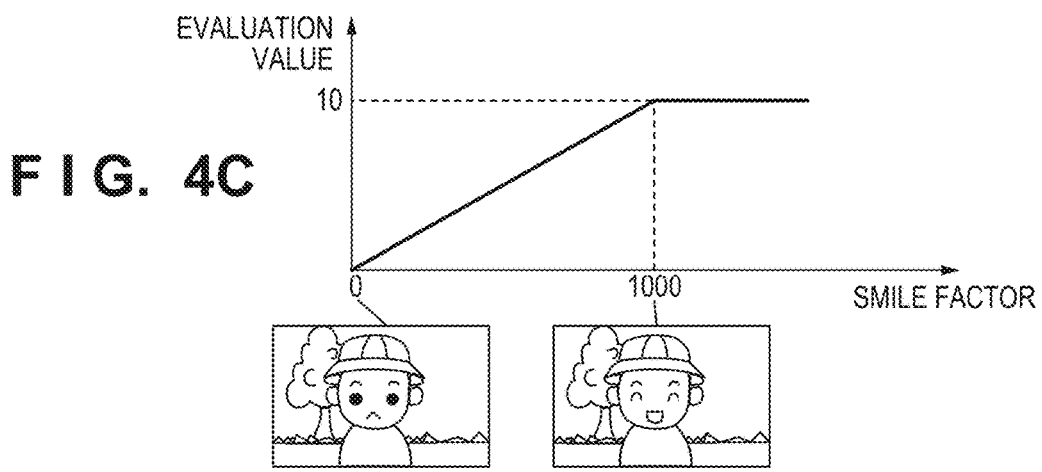
Figure 5A:
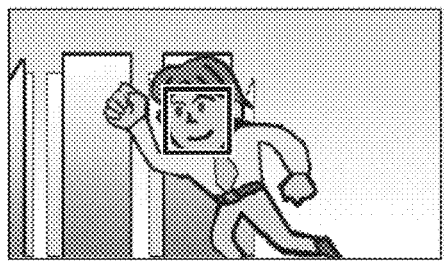
FIGS. 5A to 5D are diagrams for describing a method of calculating evaluation values based on motion vectors in image selection.
Figure 5A:
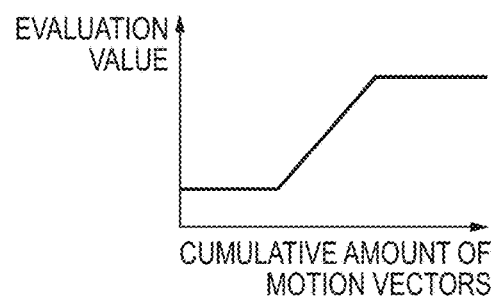
Figure 5B:
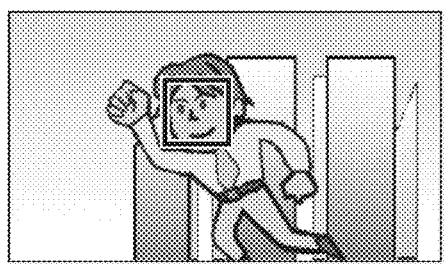
Figure 5B:
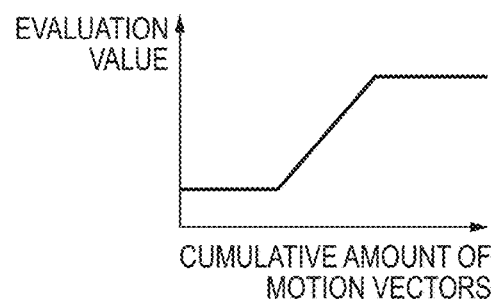
Figure 5C:
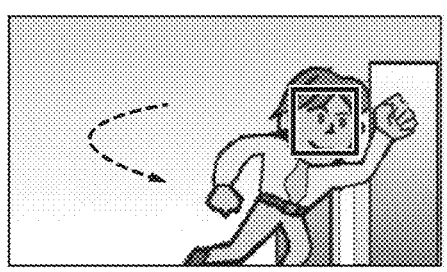
Figure 5C:
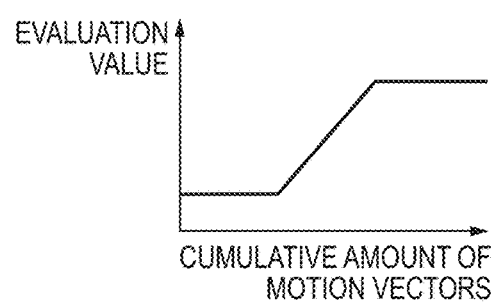
Figure 5D:
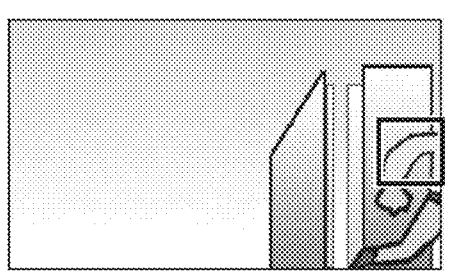
Figure 5D:
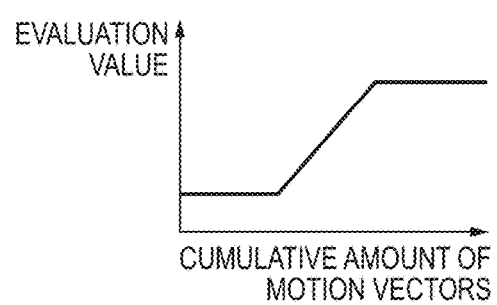

An object detection unit 115 detects an object using digital image signals obtained from the image processing unit 105. In the present embodiment, face detection processing on a person as an object is performed, and face information, such as the size and position of the detected face is extracted as object information. An expression detection unit 116 performs expression detection processing on the face using the face information obtained by the object detection unit 115. The expression detection unit 116 determines the level of smiling, using edge information of the face, and calculates a smile factor obtained by quantifying the determined level of smiling (FIG. 4C). A shooting information creation unit 117 collates the object information obtained by the object detection unit 115, the smile factor obtained by the expression detection unit 116, and shooting settings information, such as user settings as shooting information, and outputs the shooting information to an encoder unit 112.

A display unit 107 is constituted by a liquid crystal display, or the like, and performs various types of display under the control of the control unit 102. Also, the display unit 107 is integrated with a touch sensor. An AF processing unit 108 controls the lens group 108a on the basis of images obtained by the image processing unit 105, and focuses on the object. An AE processing unit 109 calculates the difference between the object luminance obtained by the object detection unit 115 and the proper luminance, and controls the mechanical mechanism 109a. An EF processing unit 110 causes a light emitting unit 111 to emit an amount of light at which the object can attain the proper luminance in a case when it is determined to perform light emission. The light emitting unit 111 is a stroboscopic device whose light source is an LED. The light emitting unit 111 may be built into the digital camera main body, or may be a removable light emitting unit.

The encoder unit 112 converts the format of the output digital image signals (image data) into a format such as JPEG, and outputs the result to an image recording unit 113. The encoder unit 112 also performs processing for writing the shooting information received from the shooting information creation unit 117 to a header of the image data.

The image recording unit 113 records the format-converted image data received from the encoder unit 112 to the memory unit 125. A memory unit 125 is an internal memory of the camera, an external memory such as a hard disk or a memory card inserted into the camera, or the like. An external connection unit 114 is an interface for connecting with an external apparatus, such as a personal computer, in a communicable manner. By connecting the external connection unit 114 to an external apparatus, it becomes possible to display a screen that is displayed on the display unit 107 on the external apparatus.

A reproduction period setting unit 118 designates images within a reproduction range in the case of performing digest reproduction of the present embodiment. In the present embodiment, it is assumed that a user sets a reproduction period such as one day or one week.

In an image evaluation unit 119, evaluation values of images designated within the reproduction period are calculated, based on shooting information recorded in the header of the image data. In relation to this evaluation value calculation, in FIG. 4A, for example, the evaluation value is higher the larger the face size, and, in FIG. 4B, the evaluation value is higher the closer the face position is to the center of the screen. The smile factor is also calculated in the face detection processing, with this smile factor being calculated to have a higher value the bigger the smile (see FIG. 4C).

Also, the present embodiment is directed to moving image reproduction, and moving images, as well as still images, are included as image data serving as material for reproduction. In the case of selecting moving images as images for digest reproduction, a motion vector of the object is calculated, as shown in FIGS. 5A to 5D, for example, and image selection is performed with the evaluation values set to a higher value the greater the motion of the object. In the case of selecting moving images, fluctuation in smile factor or face size is also evaluated, and moving images in which the smile factor is stable at a high value or moving images in which the peak of the smile factor comes in the second half of the shot, for example, are also selected. Note that, in the case of selecting moving images, the evaluation criteria relating to motion of the object in the depth direction are tightened with a lens having a shallow depth of field.

An image classification unit 120 performs clustering that uses the shooting date-time on respective images designated within the reproduction period.

An image selection unit 121 sets a selection number according to the set reproduction period, and performs image selection based on the evaluation values.

Operations from Shooting to Reproduction Next, operations, from when images are captured using the digital camera of the present embodiment to when images for digest reproduction are created and a preview is performed before determining whether to save an event, will be described.

When the operator of the camera turns on the power switch that is included in the operation unit 101, the power switch notifies the control unit 102, and the control unit 102 starts power supply to the elements constituting the camera. Because the shutter of the mechanical mechanism 109a opens when power supply is started, object image light is incident on the sensor unit 103 through the lens group 108a and the mechanical mechanism 109b of the interchangeable lens unit 122, and electrical charge is accumulated in the sensor unit 103. The control unit 102 reads out the electrical charge accumulated in the sensor unit 103, and outputs the result to the A/D conversion unit 104 as an analog image signal.

The A/D conversion unit 104 performs processing, such as sampling, gain adjustment, and A/D conversion on the analog image signal output from the sensor unit 103. The image processing unit 105 performs various image processing on the digital image signal output from the A/D conversion unit 104, and outputs the processed digital image signal. The digital image signal processed by the image processing unit 105 is sent to the AE processing unit 109 via the control unit 102. The AE processing unit 109 calculates the difference between the luminance of the object detected by the object detection unit 115 and the proper luminance, and performs control for automatically converging to the proper exposure conditions using the mechanical mechanism 109a.

Also, the object detection unit 115 performs object (face) detection processing using the digital image signal processed by the image processing unit 105, and acquires object information (size and position of face). The AF processing unit 108 acquires distance information from the user to the object using the object information, and performs control to automatically converge to an optimal focus by driving the lens group 108a. The expression detection unit 116 performs expression detection of the object (face) using the object information. In the present embodiment, expression detection is performed using edge information of the face serving as the object, and a score, that is higher the more the expression of the face is a smile, is detected.

When the control unit 102 receives notification of a shooting preparation instruction signal SW1 as a result of the operator half-pressing the shutter switch, AF processing and AE processing are performed using the image signal obtained at that time, and optimal focus and exposure conditions for shooting are acquired.

When notification of a shooting instruction signal SW2 is further received after the control unit 102 has received notification of the shooting preparation instruction signal SW1 from the shutter switch, as a result of the operator fully pressing the shutter switch from the half press, the control unit 102 transitions to the main shooting operation. The control unit 102, upon transitioning to the main shooting operation, reads out electrical charge accumulated in the sensor unit 103 that depends on object image light that has passed through the lens group 108a and the mechanical mechanism 109a, and outputs the digital image signal converted from the analog image signal by the A/D conversion unit 104 to the image processing unit 105. Note that the control unit 102 detects the current luminance value from the image data processed by the image processing unit 105. Also, the control unit 102, in a case when it is determined that the detected luminance value is lower than a predetermined threshold, outputs a light-emission control instruction to the EF processing unit 110, and the EF processing unit 110 causes the light emitting unit 111 to perform light emission to coincide with the main shooting operation.

The digital image signal that has undergone signal processing by the A/D conversion unit 104 and image processing by the image processing unit 105 is converted into a predetermined file format by the encoder unit 112, and recorded to the memory unit 125 by the image recording unit 113. Here, the shooting information creation unit 117 collates the object information obtained by the object detection unit 115, the smile factor obtained by the expression detection unit 116, and shooting settings information, such as user settings as shooting information, and outputs the shooting information to the encoder unit 112. The encoder unit 112 writes the shooting information created by the shooting information creation unit 117 to the header region of the image files at the same time as the recording of the image files by the image recording unit 113.

Note that the reproduction period setting unit 118, the image evaluation unit 119, the image classification unit 120 and the image selection unit 121 are the blocks that perform image selection for digest reproduction of the present embodiment. The blocks, in the case of performing digest reproduction of image files that are recorded in the memory unit 125, select images corresponding to predetermined conditions from the plurality of images stored in the memory unit 125 as images for digest reproduction, under the control of the control unit 102. Note that the processing of the present embodiment from setting of the reproduction period to digest image selection will be discussed later.

The images selected for digest reproduction are displayed on the display unit 107 or on an external monitor via the external connection unit 114, after finishing processing, such as title processing and colored filter processing is performed.

Digest Reproduction Image Selection Processing Next, digest reproduction image selection processing of the present embodiment will be described, with reference to FIGS. 2A and 2B.

Figure 2A:
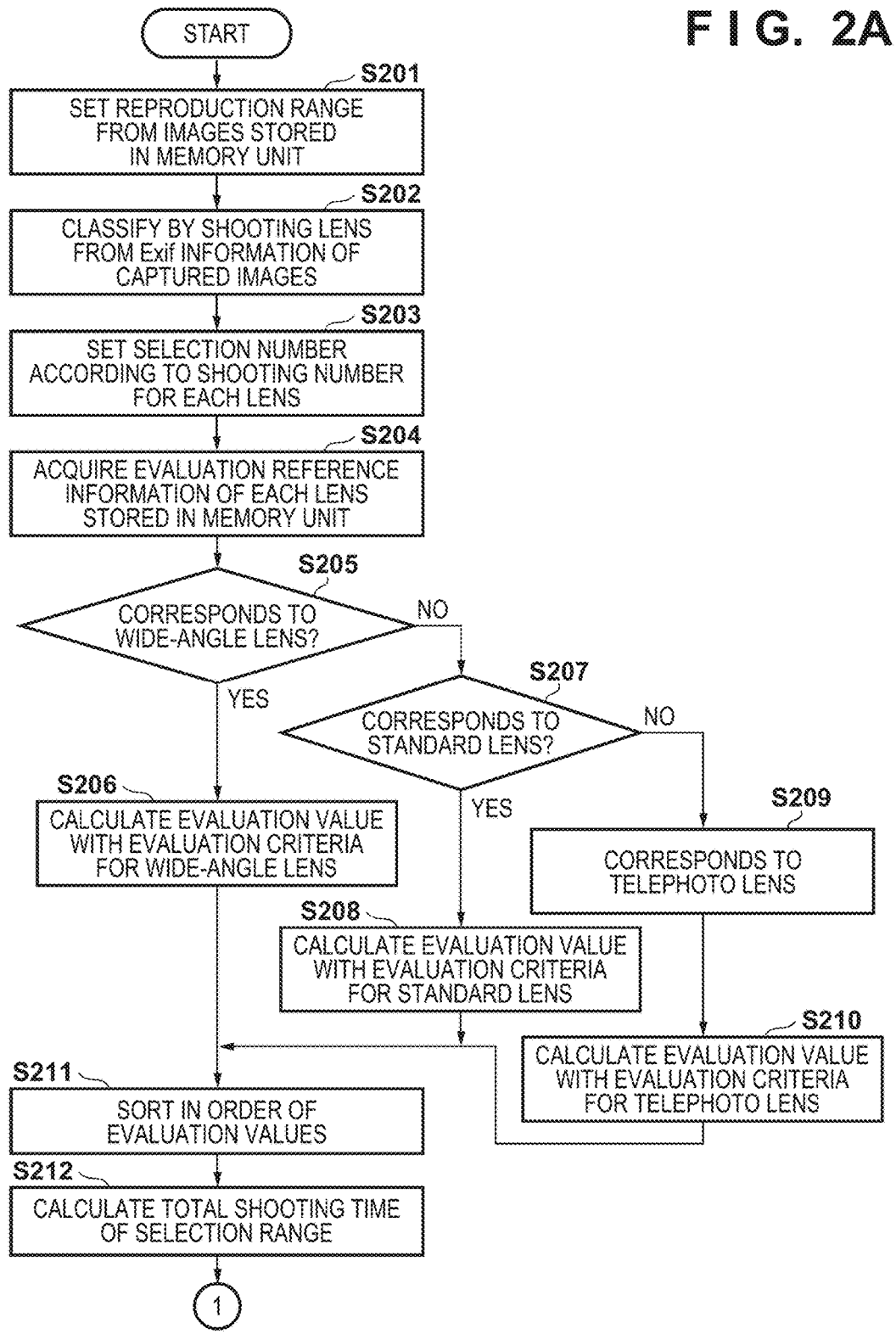

Note that the processing of FIGS. 2A and 2B is realized by the CPU of the control unit 102 reading out a program stored in the ROM to the RAM and executing the program. Also, the processing of FIGS. 2A and 2B is started when a reproduction period setting instruction for digest reproduction is given by the control unit 102 to the reproduction period setting unit 118.

In step S201, the reproduction period setting unit 118 sets the reproduction range from the plurality of images that are stored in the memory unit 125 by the image recording unit 113, and designates images within the reproduction range. In the present embodiment, it is assumed that the user sets a reproduction period, such as one day or one week.

In step S202, the image evaluation unit 119 classifies the images within the reproduction range designated at step S201 by the type of lens used for shooting based on the Exif information of the images. In the present embodiment, lens type is classified according to focal length, as illustrated in FIG. 7. Principally, a lens with a focal length of less than 24 mm is taken as a super wide-angle lens, a 24-35 mm lens is taken as a wide-angle lens, and a 35-40 mm lens is taken as a semi wide-angle lens. Also, a lens with a focal length of 40-60 mm is taken as a standard lens, a 60-135 mm lens is taken as a mid telephoto lens, a 135-300 mm lens is taken as a telephoto lens, and a lens of 300 mm or more is taken as a super telephoto lens. Note that, in the present embodiment, these classifications are further broadly divided, with wide-angle and semi wide-angle grouped as wide-angle lenses, and mid telephoto, telephoto, and super telephoto grouped as telephoto lenses.

In step S203, the image evaluation unit 119 sets the selection number, according to the number of images shot for each lens type.

In step S204, the image evaluation unit 119 acquires evaluation criteria information for each lens type that is stored in the memory unit 125 by the image recording unit 113. In the present embodiment, since there are many lens types, it is assumed that the evaluation criteria information on the lenses is acquired from the interchangeable lens unit 122 at the time of shooting and recorded to the memory unit 125, rather than the camera having the evaluation criteria information. Note that a configuration may be adopted in which the camera holds the evaluation criteria information in advance.

In steps S205 to S210, the image evaluation unit 119 calculates the evaluation value of each image, based on the evaluation criteria information for each lens type acquired at step S204. Specifically, the image evaluation unit 119, in the case of a wide-angle lens (YES at S205), calculates evaluation values using the evaluation criteria for wide-angle lenses (S206). Also, in the case of a standard lens (YES at S207), evaluation values are calculated using the evaluation criteria for standard lenses (S208), and, in the case of a telephoto lens (S209), evaluation values are calculated using the evaluation criteria for telephoto lenses (S210). Here, the information that is used in the evaluation value calculation is principally information obtained at the time of shooting that is written in the header region of the image files. This information is, for example, position information and size information of the face obtained by the object detection unit 115. The relation between the face size information and the evaluation value is set such that the evaluation value is higher the larger the face size, as shown in FIG. 4A, and the relation between the face position information and the evaluation value is set such that the evaluation value is higher the closer the face position is to the center of the screen, as shown in FIG. 4B. Note that, with a lens having a large amount of distortion, a configuration may be adopted such that, with regard to the evaluation value according to face position, the evaluation value is recalculated after having corrected the position. Note that, in the present embodiment, the expression information of the face is also written in the header region of the image files. The relation between the facial expression information and the evaluation value is set such that the evaluation value is higher the greater the smile factor, as is shown in FIG. 4C. Note that the information that is used in the evaluation value calculation is not limited to the above three types of information, and focus information, YUV histograms, zoom information, angular velocity information that is detected by a gyroscope sensor, acceleration vector information that is detected by an acceleration sensor, and the like, may also be used.

In step S211, the image evaluation unit 119 calculates a total evaluation value by adding the evaluation values obtained at steps S205 to S210, and ranks (sorts) this overall evaluation value in descending order of the evaluation values.

Here, the difference in evaluation criteria according to lens type will be described.

In order to derive the edge strength within the screen when evaluating an image, an edge signal is extracted for each block from an image that divides the screen into blocks, as shown in FIG. 9, and contrast evaluation of the image is performed with the magnitude of the edge signals obtained by peak holding in edge portions of the blocks. A higher contrast evaluation value is set the stronger the edge strength within the screen, as shown in FIG. 9. This is for checking that the object and the background are in focus and that image blur has not occurred. However, with interchangeable lens cameras, there are also telephoto lenses that are distinguished by having background bokeh, depending on the lens characteristics, and in a case when such a lens is evaluated in a similar manner to other lenses, the evaluation value will decrease for an image in which the object is in focus, but the background is blurred. In view of such a background, in the present embodiment, contrast evaluation values are calculated using evaluation criterion A in the case of a standard lens, evaluation criterion B in the case of a wide-angle lens, and evaluation criterion C in the case of a telephoto lens, as shown in FIG. 8. This makes it possible to perform image selection suited to the lens characteristic.

In step S212, the image classification unit 120 calculates the total shooting time of images within the selection range set by the user. In the present embodiment, the time difference between the first image shot at the very beginning among the images of the selection range and the last image shot at the very end is given as the total shooting time. In a case when this total shooting time is one day or less, one hour is taken as the segment of one event, and the total number of clusters in the selection range is determined with one cluster per hour. For example, in a case when the shooting start time is 8:00 and the shooting end time is 20:00, one hour is considered to be the occurrence period of one event, and events, in which the time difference between images arranged in chronological order is close, are classified as the same event, resulting in the generation of twelve clusters.

Figure 3A:
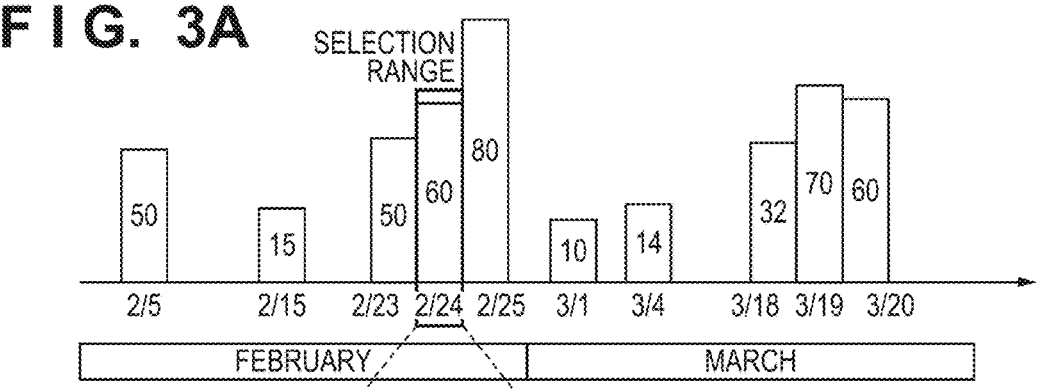
FIGS. 3A to 3C are diagrams showing clustering in a case when a selection range is one day.
Figure 3B:
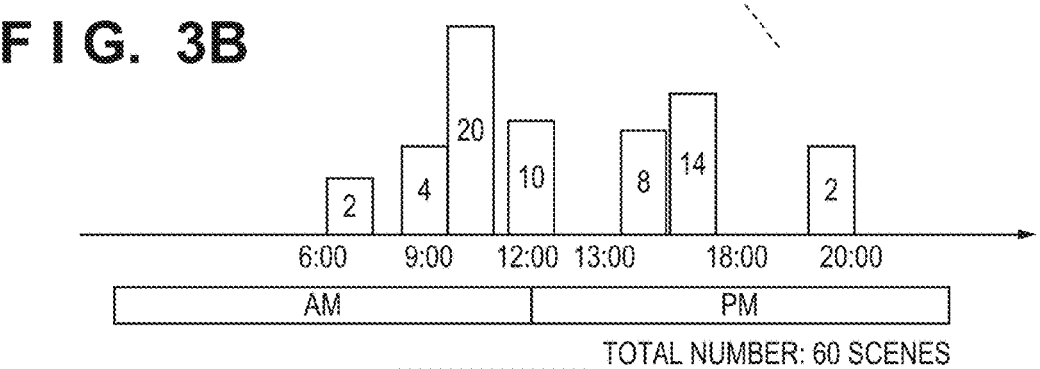

In step S213, the image classification unit 120 performs clustering according to the total number of clusters determined at step S212 (FIG. 3B). In step S214, the control unit 102 notifies a target reproduction time set by the user to the image classification unit 120.

Figure 3C:
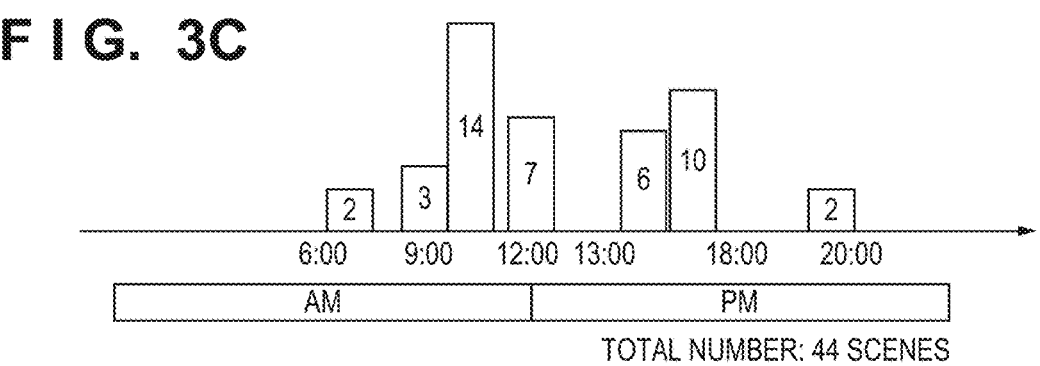

In step S215, the image classification unit 120 determines the total selection number from the target reproduction time. In the present embodiment, the reproduction time per still image is four seconds, and the reproducible number of images is derived by dividing the target reproduction time by this reproduction time. In step S216, the image selection unit 121 normalizes each cluster with the reproduction time, using the total selection number determined at step S215 (FIG. 3C). Note that, in the case of performing normalization, zero images may be set as a result of normalization when there are few reproducible images within a cluster, and thus, in the present embodiment, processing is performed by rounding up to the nearest whole number.

In step S217, the image selection unit 121 selects images in descending order of the evaluation values up to the selectable number of images in each cluster. Note that, in the present embodiment, image selection is performed based on the total evaluation value obtained by adding the evaluation values obtained at steps S205 to S210, but selection may be performed for every evaluation value, in order to increase the types of selection images for digest reproduction.

Thereafter, the image selection unit 121 rearranges the selected images in chronological order (step S218), combines the rearranged images as one moving image (step S219), reproduces the resultant moving image, and displays this moving image on the display unit 107 as a print preview (step S220). Note that the lens information used in image selection may be displayed in the end roll of this preview.

After the end of the preview, a save menu is displayed on the display unit 107 to allow the user to select whether to save this event as a moving image, and the processing is ended.

Note that, in the present embodiment, classification by the focal length of lenses as a lens characteristic is performed, but there are objects suited also to fixed focal length lenses, zoom lenses and macro lenses, and the present invention also includes classification by these variables. For example, since a sense of bokeh appears strongly in fixed focal length lenses that have a bright maximum aperture, contrast evaluation criteria similar in tendency to a telephoto lens are used so as to permit peripheral bokeh. Also, in a case when evaluation values are equivalent at the time of image selection, a higher evaluation value is set for a fixed focal length lens than for a zoom lens. Also, a macro lens is able to shoot enlarged images of objects, and is thus suitable for shooting insects and flowers. Thus, the image evaluation unit 119 may perform scene determination of images, and a high evaluation value may be set such that images shot with a lens having characteristics suited to the determined shooting scene are preferentially selected.

Also, a configuration may be adopted in which a high evaluation value is set for the lens that is mounted in the camera, or predetermined images are selected according to the lens currently mounted. Also, a configuration may be adopted in which, at the time of selecting images, optimal images are selected according to the lens characteristics, such that images that clearly differ in the degree of distortion or bokeh or in the amount of decrease in peripheral light are not continuous. Also, in a case when an auto color effect is set, a configuration may be adopted such that a filter unsuitable for that lens is not applied, for example, such that a filter for increasing the amount of peripheral light is not applied to images shot with a fish-eye lens.

According to the present embodiment, as described above, erroneous judgment in image selection can be avoided and high quality digest reproduction images can be created, by performing selection of images for digest reproduction with consideration for the lens used in shooting the images.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that selects images for digest reproduction from a plurality of images, the apparatus comprising:
    at least one processor or circuit configured to perform the operations of the following units:
        (a) an information acquisition unit configured to acquire, for every image, shooting information including information on a lens used in shooting the images;
        (b) an image evaluation unit configured to derive evaluation values for images based on the shooting information and an evaluation criterion; and
        (c) an image selection unit configured to select images for digest reproduction by ranking images based on the evaluation values,
    wherein the image evaluation unit derives the evaluation values of the images using different evaluation criteria based on a characteristics of the lens used in shooting the images.

2. The apparatus according to claim 1, wherein the shooting information includes information relating to lens type as the information on the lens used in shooting the images, and
    wherein the image evaluation unit classifies the plurality of images by lens type, and sets a selection number according to the number of classified images for every lens type.

3. The apparatus according to claim 1, wherein the image selection unit selects, with regard to the images ranked based on the evaluation values, a plurality of images that are determined based on a predetermined reproduction time in descending order of the evaluation values.

4. The apparatus according to claim 1, wherein the at least one processor or circuit is further configured to perform the operations of:
(d) a reproduction unit configured to rearrange and to combine the selected images in chronological order as a single moving image, and to reproduce the moving image.

5. The apparatus according to claim 1, wherein the shooting information includes object information detected from the images.

6. The apparatus according to claim 5, wherein the object information includes a position and a size of the object, and
wherein the evaluation values are calculated using the object information.

7. The apparatus according to claim 5, wherein the at least one processor or circuit is further configured to perform the operation of:
(d) an expression detection unit configured to detect an expression of a face,
wherein the object is the face of a person, and the object information includes at least one of a position, a size, a distance from a screen center, and a smile factor of the face.

8. The apparatus according to claim 1, wherein the evaluation values are calculated using angular velocity information detected by a gyroscope sensor or an acceleration vector information detected by an acceleration sensor.

9. The apparatus according to claim 1, wherein, in a case of selecting a moving image as the image, the evaluation value is calculated using a motion vector of the object.

10. The apparatus according to claim 1, wherein the at least one processor or circuit is further configured to perform the operations of:
(d) a determination unit configured to determine a shooting scene of images,
wherein the image evaluation unit sets a high evaluation value for an image shot with a lens suited to the determined scene.

11. The apparatus according to claim 1, wherein the evaluation value is calculated using a contrast evaluation value obtained from an image, and
wherein a higher contrast evaluation value is set the stronger a strength of an edge portion within a screen.

12. The apparatus according to claim 11, wherein the image evaluation unit sets a higher evaluation value for a lens with a greater focal length than for a lens with a lesser focal length, in a case of evaluating edge portions of equivalent strength, with regard to the contrast evaluation value.

13. The apparatus according to claim 12, wherein the image evaluation unit sets a higher evaluation value for a fixed focal length lens than for a zoom lens, in a case when the evaluation values are equivalent.

14. The apparatus according to claim 1, wherein the image processing apparatus is an interchangeable lens-type image capturing apparatus, and
wherein the image evaluation unit sets a higher evaluation value for an image shot with a lens currently mounted in the image capturing apparatus.

15. The apparatus according to claim 14, wherein the at least one processor or circuit is further configured to perform the operations of:
(d) a lens information acquisition unit configured to acquire, from the lens currently mounted in the image capturing apparatus, information on the lens.

16. The apparatus according to claim 14, further comprising a display unit configured to display information on the lens currently mounted in the image capturing apparatus at a time of digest reproduction.

17. The apparatus according to claim 1, wherein the image evaluation unit derives the evaluation values of the images using different evaluation criteria based on the focal length of the lens used in shooting the images.

18. An image processing method that selects images for digest reproduction from a plurality of images, the method comprising:
acquiring, for every image, shooting information including information on a lens used in shooting the images;
deriving evaluation values for images based on the shooting information and an evaluation criterion; and
selecting images for digest reproduction by ranking images based on the evaluation values,
wherein, in deriving the evaluation values of the images, deriving the evaluation values of the images using different evaluation criteria based on characteristics of the lens used in shooting the images.

19. A non-transitory computer-readable storage medium storing a program for causing a computer to execute an image processing method that selects images for digest reproduction from a plurality of images, the method comprising:
acquiring, for every image, shooting information including information on a lens used in shooting the images;
deriving evaluation values for images based on the shooting information and an evaluation criterion; and
selecting images for digest reproduction by ranking images based on the evaluation values,
wherein, in deriving the evaluation values of the images, deriving the evaluation values of the images using different evaluation criteria based on characteristics of the lens used in shooting the images.

* * * * *